INVENTORS.
Morton Antler
Simeon J. Krumbein

United States Patent Office 3,484,209
Patented Dec. 16, 1969

3,484,209
CORROSION RESISTANT ELECTRIC CONTACTS
Morton Antler, Wilton, Conn., and Simeon J. Krumbein, Bronx, N.Y., assignors to Burndy Corporation, a corporation of New York
Filed Dec. 8, 1966, Ser. No. 600,132
Int. Cl. H01h 1/00; C23f 11/00
U.S. Cl. 29—195           18 Claims

ABSTRACT OF THE DISCLOSURE

An electroplate assembly is provided resistant to galvanic corrosion comprising a metal substrate having adhering thereto a porous plating of a metal more noble than the metal substrate, the pores of the more noble metal being impregnated with an organic corrosion inhibitor which inhibits galvanic corrosion between the substrate and the porous plating in humid environments.

---

Figure 1:

This invention relates to a method for improving the resistance of porous electroplates to galvanic corrosion, and to electric contacts, for example, as used in electric connectors of the snap-in types, having a contact portion comprising an electroplate assembly treated to resist galvanic corrosion.

Electric connectors having contact portions of cupreous metal, such as copper, Phosphor bronze, brass, beryllium-copper, and other metals, such as nickel, iron-nickel alloys, etc., generally require a protective metal coating in order to protect the contact portion against surface corrosion so as to insure low contact resistance at the contact surface under a diversity of environmental conditions.

Nickel and nickel-containing alloys, such as tin-nickel underplates, have come into increasing use in electric contacts. By nickel or other metal underplate is meant a plating of nickel on the contact portion of a copper or cupreous metal connector, the nickel thereafter being coated with an overplate of a more noble metal, such as gold, rhodium, or the like. However, nickel has certain disadvantages as an underplate or substrate in certain atmospheric environments. Despite its many advantages, nickel is susceptible to the corrosive influence of the atmospheric pollutant, sulfur dioxide ($SO_2$), at ambient temperatures under conditions of high humidity, for example 70° or higher. At relative humidities substantially below this level, nickel tends to remain bright so that nickel-containing contacts are expected to show good stability in relatively dry warehouse environments. However, in field use, it is not uncommon for the humidity to exceed the critically high level.

The type of corrosion that occurs in such environments is generally galvanic in nature where the overplate of the more noble metal is porous. It is desirable, because of economic considerations, to limit the plating thickness of the more expensive noble metals, such as gold. Gold plating thickness of approximately 40 millionths of an inch have been found quite acceptable as a contact surface. Unfortunately, however, such plating thicknesses have a tendency to be porous and result in poor behavior as a contact surface in continued use due to galvanic corrosion of the supporting metal substrate, such as where the supporting substrate is nickel and the environment of use is one containing sulfur dioxide in minor amounts.

Corrosion of nickel substrate by sulfur dioxide at high relative humidity is hypothesized as an electrochemical phenomenon involving a concentrated "surface solution" of the gas in an invisibly thin, but finite, water layer on metal. One theory is that the layer may originate from water vapor in the atmosphere through several different modes of surface adsorption and condensation. Whatever the theory, the atmospheric gases dissolve in the water layer and convert it into an electrolyte which forms an electrolytic bridge of low conductivity between the substrate metal and the noble metal overplate. In the system gold and nickel, gold is the cathode while nickel becomes the anode and galvanically dissolves in the electrolyte to form a nickel salt which exudes or bleeds out from the pores as a hydrate and adversely affects the contact resistance of the connector. The cathode being porous has a much larger area than the minute points at the bottom of the pores. Under such circumstances, corrosive attack at these points will be accelerated leading to formation and growth of insulating corrosion products in the pores and their exudation out onto the gold surface.

Corrosion inhibiting techniques have been proposed for electric contacts involving systems of gold over silver, chromating being a common one. While these techniques have in some regard been helpful, they have not been able to eliminate the corrosion problem arising from exposure of electric contacts to sulfur compound containing environments. Attempts at using certain waxes alone or mixed with liquid organic lubricants have not been wholly successful. In some instances, these materials themselves have tended to raise the contact resistance and even to accelerate the corrosion of the contact, so as to negate any gain that might have been obtained in their use.

It would be desirable to have a corrosion inhibitor that would be substantially effective when added in amounts sufficient to penetrate the pores while avoiding building up a surface layer of higher contact resistance than that possessed by the metal. In addition, it would be desirable to have an inhibitor which is substantially self-lubricating, a property which is preferred in electric connectors of the snap-in type.

It is thus an object of the invention to provide a method for inhibiting galvanic corrosion between a metal substrate and a porous overplate of metal more noble than the substrate.

Another object is to provide a substantially corrosion-resistant electroplate assembly comprising a metal substrate covered by a porous plating of a more noble metal.

Still another object is to provide a substantially corrosion-resistant electric connector, the contact-making portion of which comprises a metal substrate having a porous metal overplate of more noble metal which has been treated to inhibit galvanic corrosion between the metals.

A further object is to provide an electric contact having a contact-making portion comprising an electroplate assembly characterized by resistance to galvanic corrosion and by low contact resistance between the contact-making portion and a complementary element in contactable relationship therewith.

Figure 2:
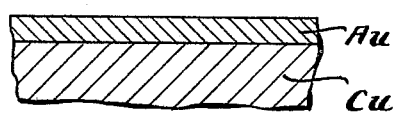
Figure 3:
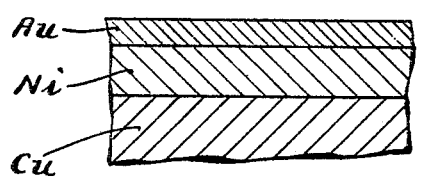
Figure 4:
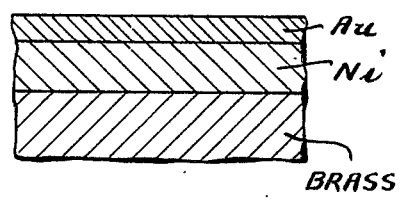
Figure 5:
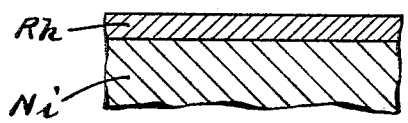
Figure 6:
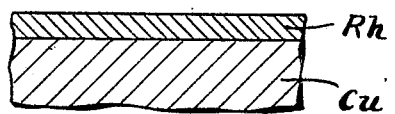
Figure 7:
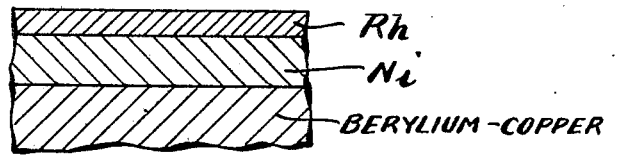
Figure 7:
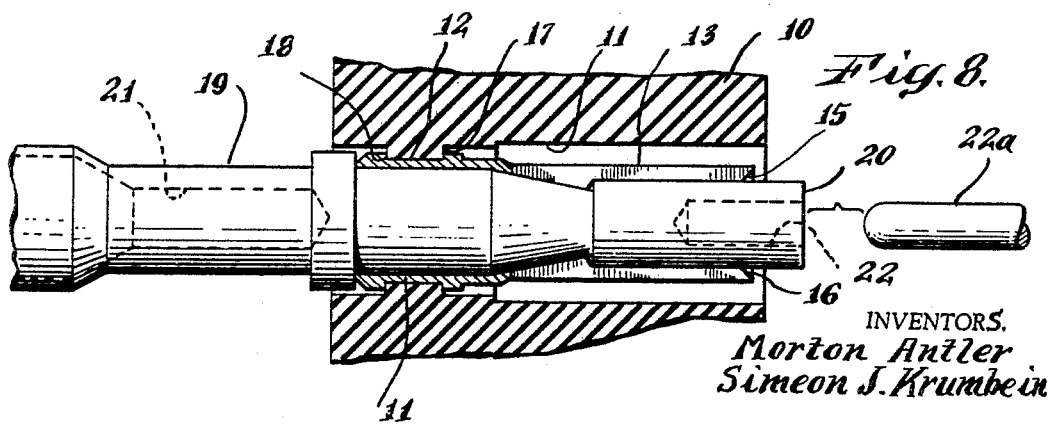

These and other objects will more clearly appear when taken in conjunction with the following disclosure and the accompanying drawing, wherein:

FIGS. 1 to 7 are cross sections of various electro-plate assemblies, among others, which may be treated in accordance with the invention; and FIG. 8 is illustrative of one type of an electric contact, in this instance an electric connector of the snap-in type, having improved resistance to galvanic corrosion in accordance with the invention.

In accordance with the invention, galvanic corrosion of electroplate assemblies comprising a metal substrate coated with a porous plating of a more noble metal may be inhibited by providing within the pores an organic compound adapted to block off the galvanic action between the two metals. The organic compound should have a molecular structure capable of being attached in or near the pores while at the same time possessing a hydrophobic group to keep moisture from entering the pores and setting up an electrolytic cell via absorbed atmospheric pollutants, such as sulfur dioxide.

The compounds found to be effective for this purpose are those having polar-non-polar structure, a group on one end of the molecule having a strong affinity for the metal at the pore, the group at the other end being strongly hydrophobic to the extent of keeping moisture from entering the pores.

The compounds found particularly advantageous for inhibiting galvanic corrosion are those selected from the class of compounds referred to broadly as N-alkoyl or N-alkylaminocarboxylic acids or their salts. Examples of such compounds are N-Lauroyl sarcosine (N-methyl, N-lauroyl aminoacetic acid), N-oleoyl sarcosine, N-stearoyl sarcosine and similar compounds.

The general structure of the compound may be represented as follows:

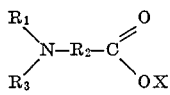

where:

$R_1$ is a substance selected from the group consisting of long chain alkyl and alkoyl hydrophobic groups having 8 to 22 carbon atoms $R_2$ is an alkylene group containing 1 to 3 carbon atoms $R_3$ is a substance elected from the group consisting of H, a lower alkyl group containing 1 to 5 carbon atoms, and an aliphatic acid group containing 2 to 4 carbon atoms X is a substance selected from the group consisting of inorganic and organic cations such as Na, K, Li, H, quaternary ammonium cations, etc.

As illustrative of sarcosine salts which may be employed in the carrying out of the invention, the following examples are given:

Sodium salt of N-lauroyl sarcosine

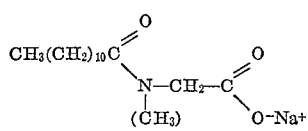

Sodium salt of N-stearoyl sarcosine

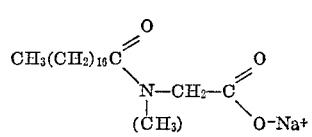

Sodium salt of N-oleoyl sarcosine

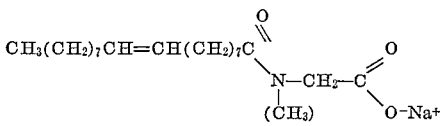

Other cations, whether inorganic (e.g. K, Li, etc.) or organic (e.g. quaternary ammonium cations) may be substituted for the sodium.

The alkyl portion of the radical which is hydrophobic also confers self-lubricating properties to the contact-making portion of the electric contact. The amino-carboxylic portion of the molecule is strongly metal avid, and it is believed provides the means by which the molecule is anchored in or at the pores.

Examples of electroplate assemblies with which the inhibitor may be employed are shown in FIGS. 1 to 7, the figures showing, respectively, the systems Au-Ni, Au-Cu, Au-Ni-Cu, Au-Ni-brass, Rh-Ni, Au-Phosphor bronze, Au-Ni-beryllium-copper; there are, in addition, other examples too numerous to mention. The pores in the top layer are not discernible as they are extremely fine.

Generally speaking, the contact-making portion of an electric contact is made of cupreous metals, such as copper or the copper-base alloys. Phosphor bronze, brass, beryllium-copper, and the like. Gold may be plated over substrates of these metals or nickel may be employed as an underplate over the copper-base, the gold or similar noble metal being plated over the nickel. The term "substrate" used herein is meant to refer to the underlying metal beneath the noble metal plate, whether the underlying metal is an underplate or the contact element itself without the underplate.

An example of an electric contact embodying the invention is shown in FIG. 8, this particular contact being referred to as a connector of the snap-in type. The connector here shown is an assembly comprising a block of insulating material 10, e.g. a phenolic resin or other plastic, having a circular bore 11, a portion of which bore is reduced in diameter at 12. Snap fitted into the bore is a retainer member 13 of spring material, e.g. beryllium-copper, having a sleeve portion 14 which is split and a plurality of projecting spring fingers, such as fingers 15 and 16, the split extending past the projecting fingers. By compressing the retainer during insertion, it is caused to snap or spring-fit in place and held against longitudinal displacement in the bore via annular shoulders 17 and 18 acting on corresponding shoulders in the sleeve which is recessed to form a complementary fit with the reduced diameter of the bore. Inserted into the retainer is a contact member 19, the forward portion 20 of which extends through and past the spring finger of the retainer, the contact member having exterior surfaces and shoulders which complement similar surfaces and shoulders to interlock the member and the retainer as shown. The contact member is provided with end bores 21 and 22 for receiving conductor pins.

The surface of contact-making socket 22 of the contact member is protected in accordance with the invention, the socket being adapted to receive and mate with plug 22a. The plug is also plated and treated in accordance with the invention. The plug is dimensioned to form an interference fit with socket 22.

A method employed to test the efficacy of certain organic compounds as a preventive of galvanic corrosion comprises taking rectangular sections of relatively pure nickel and polishing the section with silicon carbide paper to produce a surface roughness of about 4 to 6 microinches, Center Line Average (C.L.A.), in one series and 7 to 9 microinches C.L.A. in another series which compares to the order of magnitude usually found in typical electric contacts of about 10 microinches C.L.A. The sections are cleaned of any surface contamination and gold plated in a conventional acid bath to a thickness of approximately 19 microinches, the thickness ranging generally from about 17 to 23 microinches. This thickness is chosen in order to assure sufficient surface porosity. The nickel sections are rack plated in groups of sixes, with two in each each group serving as controls and four treated with inhibitors.

Since a meaningful test for a corrosion inhibitor is one that will indicate how well it protects the base metal or substrate from the most important corrodants, the tests are conducted in a high humidity, sulfur dioxide-containing environment. The testing method consists in exposing the entire plating lot of six sections (the nickel sections were $3/16''$ x $1''$ x $7/8''$) to the sulfur dioxide/high humidity environment in a sealed chamber for 20 to 24 hours. About 5 to 6% by volume of $SO_2$ is initially injected into a vacuum-tight 2-liter glass container. The cover has at least two glass tubular openings; one to be attached to a source of vacuum and the other having a flared end capable of retaining a hypodermic septum. A measured vacuum is drawn on the container prior to $SO_2$ injection in order to assure a total internal pressure close to atmosphere at a particular test temperature. The humidity is controlled by adding an accurately measured volume of distilled water to the glass container calculated to produce 85 to 90% humidity at the test temperature. This value of humidity includes a safety factor to avoid the possibility of condensation on the samples.

The test samples are impregnated with various materials by forming a dilute solution of the material to be tested, for example of 1% solution, into which the specimen is dipped, removed and the surface uniformly dried. The use of a dilute solution is important in that it avoids the formation of thick film deposits on the surface of the plate. Such deposits do not give a true indication of corrosion inhibition, and, moreover, thick deposits are not desirable on the surface of an electric contact. Usually, the dilute solutions are formed by dissolving the inhibitor in hot water, although other vehicles may be employed in place of water. The solution concentration may range from about 0.1 to 10% by weight.

After the samples have been treated with the inhibitor, they are hung in groups of sixes in the container (two controls and four treated specimens). The container is evacuated to about 12 cm. of mercury below normal atmospheric pressure, the exact amount depending upon ambient temperature. About 150 cc. of $SO_2$ gas is added by means of a gas-tight syringe followed by an addition of the proper amount of distilled water to provide the desired humidity. The container is then carefully placed in a forced draft oven set to $45\pm1°$ C. for about 22 hours. After removal of the container from the oven, the cover is carefully removed and a moistened strip of Congo Red paper thrust quickly into the chamber. An immediate positive test for $SO_2$ should be indicated, otherwise the test is repeated.

The samples removed from the container are compared visually with each other under a 20-power microscope to determine the relative build-up of corrosion pits. Since it is desirable that an electric contact maintain low contact resistance in corrosive environments, the effect of the corrosion test on contact resistance is also determined.

The contact resistance of the treated samples is determined by applying a solid gold, round-ended probe under sufficient load to a point on the surface to bring the contact resistance to below 0.002 ohm, the open circuit voltage between the probe and the specimen being 50 mv. or less. A number of readings are determined for each sample. An applied load of less than 60 grams generally indicates low contact resistance, whereas values in excess of 100 grams are an indication that the contact resistance is adversely affected by exposure to $SO_2$. Values in excess of 250 grams indicate that the contact resistance is substantially adversely affected by $SO_2$ exposure.

As illustrative of results obtained in conducting corrosion tests on gold plated over nickel, the following is given:

TABLE I

| Test No. | Treatment | Corrosion Results |
|---|---|---|
| 1 | 1% sloution of sodium salt of N-lauroyl sarcosine in water (85° C.) followed by flat drying. | Very good inhibition. |
| 2 | 1% solution of sodium salt of N-lauroyl sarcosine in 0.01 N NaOH (about 50° C.) followed by drying. | Do. |
| 3 | 1% solution of sodium salt of N-stearoyl sarcosine followed by drying (70-75° C.) | Very good to excellent inhibition. |
| 4 | 1% solution of sodium salt of N-oleoyl sarcosine (pH=10.8) followed by drying (70-75° C.). | Excellent inhibition. |
| 5 | 1% solution of N-oleoyl sarcosine (acid form) in 1,1,1, trichloroethane (55° C.) for less than 1 minute followed by drying. | Do. |
| 6 | Same as Test No. 4 above except that a lubricant barrier layer is applied by dipping treated sample in a solution of $Cl_3CCH_3$ containing 1% 5-ring polyphenyl ether and 1% paraffin wax for 1 minute or less at 52° C. | Do. |
| 7 | Same as Test No. 4 above except that a lubricant barrier layer of commercial grade N-oleoyl sarcosine (acid form) is applied by dipping the treated sample in $Cl_3CCH_3$ containing 1% of the sarcosine at room temperature. | Do. |
| 8 | Subjecting the plate to inhibiting treatment by dipping in 1% solution of sodium salt of N-stearoyl sarcosine in excess NaOH (pH=10.2) at 74° C., then drying followed by applying barrier lubricant layer by dipping in $Cl_3CCH_3$ containing 1% paraffin wax and 1% 5-ring polyphenyl ether for 1 minute or less at 52° C. | Do. |
| 9 | Same as Test No. 2 above except that a lubricant barrier layer is applied by dipping sample in commercial grade oleoyl sarcosine (acid form) followed by drying. | Do. |
| 10 | 1% sodium salt of N-lauroyl sarcosine in excess NaOH (pH=12.0 to 12.5) at 80° C. | Do. |
| 11 | Same as Test No. 10 above except that a lubricant barrier layer is applied by dipping treated sample in a solution of $Cl_3CCH_3$ containing 1% 5-ring polyphenyl ether and 1% paraffin wax for 1 minute or less at 52° C. | Do. |
| 12 | 1% tolyl, triethanolamine salt of N-lauroyl sarcosine (commercial grade) in water at 75° C. (pH=7). | Very good inhibition. |
| 13 | Same as Test No. 12 above except that a lubricant barrier layer is applied by dipping treated sample in a solution of $Cl_3CCH_3$ containing 1% 5-ring polyphenyl ether and 1% paraffin wax for 1 minute or less at 52° C. | Do. |
| 14 | 1% disodium salt of N-lauryl beta-iminodipropionic acid (pH=11.2) at 72° C. | Good inhibition. |
| 15 | Same as Test No. 14 except that a lubricant barrier layer is applied by dipping treated sample in a solution of $Cl_3CCH_3$ containing 1% 5-ring polyphenyl ether and 1% paraffin wax for 1 minute or less at 52° C. | Very good inhibition. |
| 1A | 1.36% solution of octadecylamine hydrochloride in benzene (70° C.). | Accelerated corrosion. |
| 1B | 1% solution of octadecylamine hydrochloride in benzene (70° C.). | Do. |
| 1C | Solution of octadecylamine hydrochloride in water (87° C.) and flat drying for 1.5 hours. | No inhibition. |
| 1D | 1% 5-ring polyphenyl ether; 0.33% paraffin wax in 1,1,1-trichloroethane suspension (40° C.) flat drying. | Moderate inhibition. |
| 1E | 0.01 N sodium carbonate solution (50-80° C. for 1 hour) followed by hot water dip. | Do. |
| 1F | 1% solution of sodium oleate (pH=8.5-9) for 30 minutes at about 75° C. | Slight to moderate inhibition. |
| 1G | 1% sodium stearate solution at 85° C. | Slight inhibition. |
| 1H | Control samples (no impregnant). | Severe corrosion. |

As will be noted, Tests 1 to 15 gave good to excellent inhibiting results using compounds selected from the class of compounds of N-alkyl aminocarboxylic acids or salts thereof. In testing the sodium salts of N-lauroyl, N-stearoyl and N-oleoyl sarcosine (Tests Nos. 1 to 5), it was noted that the latter was particularly beneficial in preventing galvanic corrosion in an $SO_2$ environment. In Tests Nos. 6 to 11, good to excellent results were obtained in systems where a lubricant barrier layer was additionally employed to provide a lubricated surface over the impregnated gold plate, this being preferred, for example, in a contact of the pin and socket type (note FIG. 8). It is important that the lubricant barrier layer be compatible with the inhibitor.

Test No. 12 illustrates an organic salt of N-lauroyl sarcosine of the tolyl triethanolamine type which gave very good results even with a barrier layer of 5-ring polyphenyl ether and paraffin wax (Test No. 13). Good inhibition was indicated with a disodium salt of N-lauryl beta-iminodipropionic acid (Test No. 14), the results being further improved, i.e. very good, with a lubricant barrier layer applied as shown in Test No. 15.

As is evident from the foregoing, the inhibitor may comprise either N-alkoyl or N-alkyl sarcosine or salts thereof with or without a compatible lubricant barrier layer.

Referring now to the tests outside the invention, that is 1A to 1G, it will be noted that they indicated insubstantial inhibition, and even accelerated corrosion. Test No. 1H, the controls or untreated samples, exhibited severe corrosion. Generally speaking tests, with the fatty acids, sodium caprylate, sodium laurate, sodium stearate and sodium oleate as the impregnant were unsatisfactory.

With regard to Tests 1 to 5, the load to produce a contact resistance of 2 milliohms was less than 60 grams on practically all the points probed, whereas with Tests 1A to 1C and 1H, the load to produce a resistance 2 milliohms was substantially above 100 grams, and often ranged higher than 350 grams. A visual examination of 1D to 1G indicated that they would also exhibit high contact resistance.

Examination of the various test pieces under a microscope showed that whenever corrosion occurred, it was restricted to the pores, rather than by diffusion of nickel or corrodants through the bulk plate. The corrosion byproduct, which was generally a hydrated nickel salt, appeared as pompon shaped blooms, erupting from discrete sites on the surface on the gold plating. They appear as fine needle-like crystals randomly oriented within the confines of a spheroid. When these corrosion by-products are contracted by gold contact probe, a load as high as 350 grams is sometimes necessary to bring the contact resistance down to 2 milliohms. In cases of severe corrosion, even this load was not sufficient to bring the resistance down, this load being the maximum value which could be applied by the instrument. However, with respect to Tests 1 to 15, the samples after exposure to $SO_2$ were relatively clean and exhibited practically no corrosion spots.

Tests with other alkali metal salts of alkyl aminocarboxylic acids have given good results, such as disodium salts of N-lauryl aminodiacetic acid.

Tests conducted on gold over a silver underplate using a 1% solution of a sodium salt of N-lauroyl sarcosine in excess NaOH (pH=12 to 12.5) at 80° C. as the impregnant followed by drying gave good inhibition based on the $SO_2$ test described herein. Good inhibiting results were also obtained with the same impregnant followed by the application of a lubricant barrier layer from a solution of $Cl_3CCH_3$ containing 1% paraffin wax and 5-ring polyphenyl ether, the barrier layer being applied by dipping the impregnated plate in the solution for 1 minute or less at 52° C., followed by drying.

Tests conducted on gold plate over a substrate of Phosphor bronze in the $SO_2$ test environment described herein before gave good to excellent results as follows:

TABLE II

| Test No. | Treatment | Corrosion Results |
|---|---|---|
| 16 | 1% sodium salt of N-oleoyl sarcosine in excess NaOH (pH=10.8) at 76° C. | Good to very good inhibition. |
| 17 | Same as Test No. 16 except a lubricant barrier layer was applied comprising a solution of $Cl_3CCH_3$ containing 1% of 5-ring polyphenyl ether and 1% paraffin wax; 1 minute at 52° C. | Do. |
| 18 | 1% sodium salt of N-lauroyl sarcosine in excess NaOH (pH=12 to 12.5) at 80° C. | Very good to excellent inhibition. |
| 19 | Same as Test No. 18 except that a lubricant barrier layer was applied comprising a solution of $Cl_3CCH_3$ containing 0.75% of 5-ring polyphenyl ether and 0.75% paraffin wax for 1 minute at 52° C. | Do. |

A test conducted as in Test No. 19, above, but using an electroplate assembly of gold over nickel over Phosphor bronze indicated good inhibition in the test environment of $SO_2$. Similarly, a test conducted on gold over brass using the same treatment of Test No. 18 resulted in very good inhibition. Excellent inhibition was indicated on the electroplate assembly gold over nickel over brass using a 1% solution of sodium lauroyl sarcosinate in excess NaOH (pH=12 to 12.5, at 80° C.), but including the barrier layer set forth in Test No. 19.

A test conducted on rhodium over nickel using N-oleoyl sarcosinate as the inhibitor gave relatively good results when post-treated with a lubricant barrier layer.

One of the advantages of the corrosion inhibitor employed in the invention is that it is also self-lubricating. For example, N-oleoyl sarcosine is sufficiently oily to provide its own lubrication, or it may be applied as a lubricant barrier layer to an electroplate assembly which has been previously impregnated, for example, with a sodium salt of N-lauroyl sarcosine (note Test No. 9).

Generally, it may be desirable to subject the corrosion-inhibited electroplate to a post-treatment involving the application of a thin lubricant barrier layer to the plated surface, which, in some instances may aid in further inhibiting corrosion (note improvement of Test No. 15 over No. 14). Various types of lubricant barrier layers may be employed so long as they are compatible with the inhibitor employed. As shown in Table I, a preferred lubricant barrier layer is one formed by dissolving 1% each of the materials, 5-ring polyphenyl ether and paraffin wax, in $Cl_3CCH_3$ or trichloroethylene. The treated electric contact, for example, would be dipped in the solution containing the lubricant barrier material and the solvent thereafter evaporated to leave a thin coating of the lubricant on the plated surface.

The lubricant barrier material which may be employed with the inhibitor should preferably be an organic substance such as a liquid or waxy material which is compatible with the corrosion inhibitor to the extent it does not adversely affect the efficacy of the inhibitor.

Generally speaking, the electric contact elements which are plated and treated with the corrosion inhibitor are usually made of cupreous metal. By cupreous metal is means copper and copper-base alloys, such as alloys in which copper predominates, for example, alloys containing 70% or more of copper. Examples of copper-base alloys are 95% Cu and approximately 5% Sn (Phosphor bronze) with less than 0.25% phosphorus, 90% Cu–10% Zn, 70% Cu–30% Zn, 98% Cu–2% Be, and similar alloys. As will be appreciated by those skilled in the art, other substrates may include the nickel-iron alloys containing 40 to 55% nickel and the balance iron. Examples of electroplate assemblies of particular interest are (A)

Au-Ni-cupreous metal, the cupreous metals including Cu, brasses, Be-Cu (beryllium copper), Phosphor bronze and the like; (B) Au-cupreous metal; (C) Rh-Ni-cupreous metal; (D) Au-Ni-alloy of nickel and iron; and (E) Au-(Sn-Ni underplate)-cupreous metal.

As stated hereinbefore, the metal electroplate is one which is more noble than the underlying metal. Preferably, though not necessarily, such metals will generally include the metals Au, Ag, the platinum group metals (Pt, Ru, Rh, Pd), etc. Generally, these noble metals have a negative free energy of oxidation below 25,000 calories per gram atom of oxygen at 25° C. In contradistinction, the underlying metals are generally base metals having a negative free energy of oxidation at 25° C. of greater than 25,000 calories per gram atom of oxygen.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

We claim:
1. As an article of manufacture, an electroplate assembly resistant to galvanic corrosion comprising a metal substrate having adhering thereto a porous plating of a metal more noble than the metal substrate, the pores of said more noble metal containing essentially the following compound:

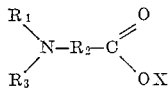

where:
$R_1$ is a substance selected from the group consisting of long chain alkyl and alkoyl hydrophobic groups having 8 to 22 carbon atoms,
$R_2$ is an alkylene group containing 1 to 3 carbon atoms,
$R_3$ is a substance selected from the group consisting of H, a lower alkyl group containing 1 to 5 carbon atoms, and an aliphatic acid group containing 2 to 4 carbon atoms,
X is a substance selected from the group consisting of Na, K, Li and quaternary ammonium cations, said compound having a hydrophobic radical which inhibits galvanic corrosion between said substrate and said porous plating in humid environments.

2. The electroplate assembly of claim 1 wherein the compound is selected from the group consisting of N-alkoyl and N-alkyl aminocarboxylic acids and salts thereof.

3. The electroplate assembly of claim 2 wherein the galvanically active metals comprise a porous plate of gold over nickel.

4. The electroplate assembly of claim 2 wherein the galvanically active metals comprise a porous plate of gold over an underplate of nickel, said nickel underplate adhering to a substrate of cupreous metal.

5. The electroplate assembly of claim 2 wherein the galvanically active metals are a porous plate of gold over a substrate of cupreous metal.

6. The electroplate of claim 2 wherein the galvanically active metals are a porous plate of rhodium over an underplate of nickel over a substrate of cupreous metal.

7. The electroplate assembly of claim 2 wherein the surface of said porous plate has a lubricant barrier layer adhering thereto compatible with the compound in the pores thereof.

8. The article of manufacture of claim 2, wherein the compound is N-oleoyl sarcosine.

9. The electroplate assembly of claim 2 wherein the compound is a salt of N-alkoyl aminocarboxylic acid.

10. As an article of manufacture, an electric contact having a contact-making portion comprising a metal substrate and a porous overplate of a more noble metal, the pores of said more noble metal containing essentially the following compound:

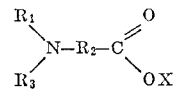

where:
$R_1$ is a substance selected from the group consisting of long chain alkyl and alkoyl hydrophobic groups having 8 to 22 carbon atoms,
$R_2$ is an alkylene group containing 1 to 3 carbon atoms,
$R_3$ is a substance selected from the group consisting of H, a lower alkyl group containing 1 to 5 carbon atoms, and an aliphatic acid group containing 2 to 4 carbon atoms,
X is a substance selected from the group consisting of Na, K, Li and quaternary ammonium cations, said compound having a hydrophobic radical which inhibits galvanic corrosion between said substrate and said porous plating in humid environments.

11. The electric contact of claim 10 wherein the compound is selected from the group consisting of N-alkoyl and N-alkyl aminocarboxylic acids and salts thereof.

12. The electric contact of claim 11 wherein the compound is a salt of N-alkoyl aminocarboxylic acid.

13. The electric contact of claim 11 wherein the galvanically active metals comprise a porous plate of gold over nickel.

14. The electric contact of claim 11 wherein the galvanically active metals comprise a porous plate of gold over an underplate of nickel, said nickel underplate adhering to a substrate of cupreous metal.

15. The electric contact of claim 11 wherein the galvanically active metals are a porous plate of gold over cupreous metal.

16. The electric contact of claim 11 wherein the galvanically active metals are rhodium over an underplate of nickel over a substrate of cupreous metal.

17. The electric contact of claim 11 wherein the surface of said porous plate has a lubricant barrier layer adhering therto compatible with the compound in the pores thereof.

18. The article of manufacture of claim 11, wherein the compound is N-oleoyl sarcosine.

References Cited
UNITED STATES PATENTS

| | | | |
|---|---|---|---|
| 2,790,779 | 4/1957 | Spivack et al. | 106—14 X |
| 2,969,295 | 1/1961 | Crishal et al. | 29—199 X |
| 3,015,580 | 1/1962 | Zisman et al. | 106—14 X |
| 3,121,016 | 2/1964 | Forinash et al. | 106—14 |
| 3,123,484 | 3/1964 | Pokras et al. | 29—199 X |
| 3,199,189 | 8/1965 | La Plante | 29—199 X |
| 3,367,754 | 2/1968 | Dugan et al. | 29—199 |

ALLEN B. CURTIS, Primary Examiner

U.S. Cl. X.R.

117—127